United States Patent [19]
Gimber et al.

[11] 3,995,223
[45] Nov. 30, 1976

[54] SEISMIC-ACOUSTIC DETECTION DEVICE

[75] Inventors: George A. Gimber, Hatboro; Edward J. Cotilla, Feasterville; Salvatore R. Picard, Hatboro; Robert F. Starry, Horsham, all of Pa.

[73] Assignee: The United States of America as represented by the Secretary of the Navy, Washington, D.C.

[22] Filed: Aug. 8, 1972

[21] Appl. No.: 279,591

Related U.S. Application Data
[62] Division of Ser. No. 14,834, Feb. 19, 1970.

[52] U.S. Cl. .............................. 328/110; 181/122; 307/232; 328/109; 340/258 B
[51] Int. Cl.² .................. G01V 1/16; G08B 13/00; H03K 5/20
[58] Field of Search ........... 307/231, 232, 233, 225, 307/208; 340/258, 261, 258 R, 258 B; 181/.5 NP, 122; 328/109, 110

[56] References Cited

UNITED STATES PATENTS

| | | | |
|---|---|---|---|
| 3,543,172 | 11/1970 | Seppeler | 307/233 |
| 3,641,443 | 2/1972 | Zerby | 307/232 |
| 3,705,417 | 12/1972 | Asmussen | 307/232 |

Primary Examiner—Malcolm F. Hubler
Attorney, Agent, or Firm—R. S. Sciascia; Henry Hansen

[57] ABSTRACT

A detection system for indicating the presence of motorized equipment in a designated area having an acoustic sensor, a seismic sensor and an acoustic signal transmitter. The seismic sensor output, processed to discriminate against vibrations of short duration, is fed, along with the acoustic sensor output, to an "ANDing" circuit which gates the acoustic transmitter. The acoustic sensor output is passed to the transmitter only during coincidence of seismic and acoustic detection.

7 Claims, 9 Drawing Figures

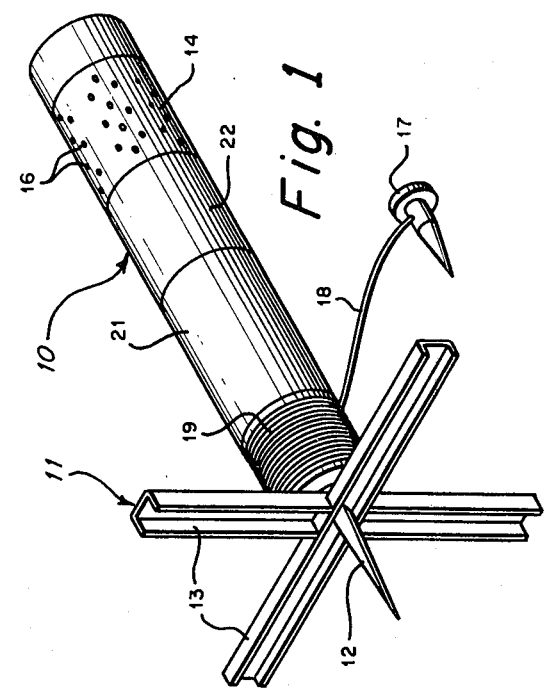
Fig. 1
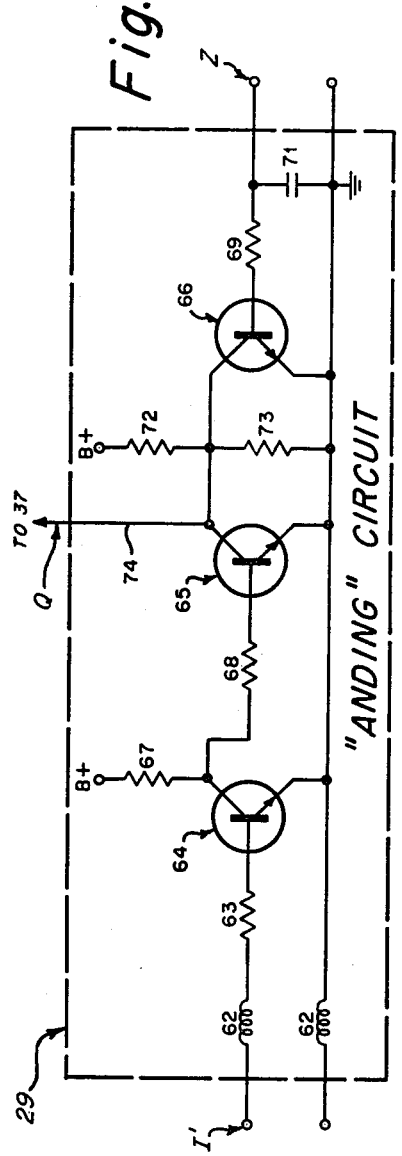
Fig. 5
Fig. 4
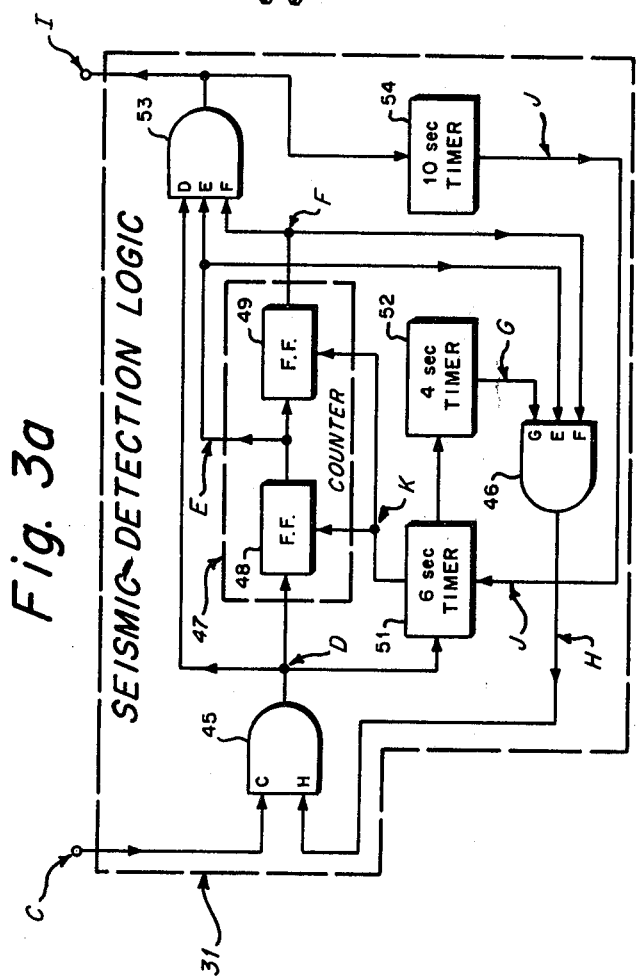
Fig. 3a

SEISMIC-ACOUSTIC DETECTION DEVICE

STATEMENT OF GOVERNMENT INTEREST

The invention described herein may be manufactured and used by or for the Government of the United States of America for governmental purposes without the payment of any royalties thereon or therefor.

CROSS-REFERENCES TO RELATED APPLICATIONS

This is a division of application Ser. No. 14,834 filed Feb. 19, 1970.

BACKGROUND OF THE INVENTION

The invention relates generally to the fields of seismic and acoustic detection of surface disturbance. It is concerned more particularly with the integration of the two types of detection means in a single portable unit. The invention also relates to the field of control circuitry used to discriminate between true and false signals.

The need for passive military intelligence about concealed enemy ground activity has encouraged the development of various "listening" systems which monitor the level of vibrations in specified areas. The information gained can serve to corroborate other forms of intelligence or, if reliable enough, electronic detection may form the sole basis for a command decision. In either case, if higher quality information is obtained, there is less likelihood of unintended encounter with the enemy and more chance of avoiding casualties and loss of time and material. When the aim is not to avoid but to locate the enemy, electronic devices can detect even a relatively small build-up of men or material.

One of the most valuable uses of military listening devices is in detecting the movement of motorized equipment by the enemy. In general, the operation of motorized equipment produces two types of vibrations. The first type, commonly referred to as seismic disturbance, is inaudible mechanical vibration induced by movement of the object. Seismic waves are transmitted through solid structure such as the earth. The second type of vibration, commonly referred to as sonic or acoustic waves, is associated with the audible noise produced by the object and is transmitted primarily through the air. In the past, remote detection and classification of motorized equipment was accomplished by monitoring either the seismic or the acoustic vibrations produced. Probes of either kind were planted manually or airdropped into the region under surveillance. The transmitted signals, if any, were received by a remote listening post.

A major problem encountered by prior art devices was minimizing the number of false alarms. Instead of detecting only the movement of motorized equipment, seismic sensing devices produced unwanted signals on ordnance detonations, tree root movement, animal movement, or nearby aircraft transits. Acoustic detection devices had similar difficulties in discriminating between noise produced by motorized equipment on the ground and transient noise from other sources. In particular, if ground vehicles were the target, passing aircraft would frequently cause false alarms. The inaccuracies of the prior art equipment seriously increased the uncertainty in detection and degraded the willingness of field commanders to rely on such information in determining the status of an area which might be held by the enemy. The high false alarm rate of the equipment also decreased the useful lifetime of a particular unit since the battery-powered transmitter spent more time in the "ON" condition than it would have if it had been reporting detection of target vehicles alone. This in turn added to the cost of the equipment and often required dangerous redeployment of seismic or acoustic probes in the same area. Moreover, a high false alarm rate of units in a designated area might overload the r.f. transmitting band being used.

SUMMARY OF THE INVENTION

Accordingly it is one of the principle objects of the present invention to reduce the number of false alarms due to vibrations from spurious sources. In solving the false signal problem, one of the principal objects of the invention is to take advantage of the different sensitivities of the two types of equipment, acoustic and seismic, due to the inherently different nature of the vibrations detectable by each equipment.

A further object is to obtain more qualitative information from a sensing device by increasing the signal to noise ratio.

Another object of the invention is to produce a vibration detector which will reject transient signals due to local ordnance detonations by establishing and implementing a minimum duration requirement for the detected signal. A further object of the invention is to incorporate, in a single unit, both a seismic and an acoustic sensor, the output from the whole unit being dependent upon simultaneous detection by both sensing means.

In order to achieve these and other objects and overcome the defects of prior sensing devices, a novel and improved implantable device has been invented which has a self-contained acoustic signal transmitter, an acoustic sensor and a remote geophone for detecting seismic disturbance. The seismic signal is processed to discriminate against vibrations of short duration caused, for example, by nearby bomb blasts. An "ANDing" circuit receives the acoustic and seismic signals and gates the acoustic transmitter. The acoustic signal is passed to the transmitter only during coincidence of seismic and acoustic detection.

BRIEF DESCRIPTION OF THE DRAWINGS

FIG. 1 is an isometric view of a preferred embodiment of an acoustic and seismic detector according to the invention;

FIG. 3a is a logic diagram showing in more detail the elements of a seismic detection logic unit of FIG. 2;

FIG. 4 is a schematic drawing of an integrator circuit of FIG. 2;

FIG. 5 is a schematic drawing of an "ANDing" circuit of FIG. 2;

FIG. 7 is a timing diagram illustrating the relationship of typical signals as applied to the seismic detection logic unit of FIG. 3a.

DESCRIPTION OF THE PREFERRED EMBODIMENT

Figure 2:
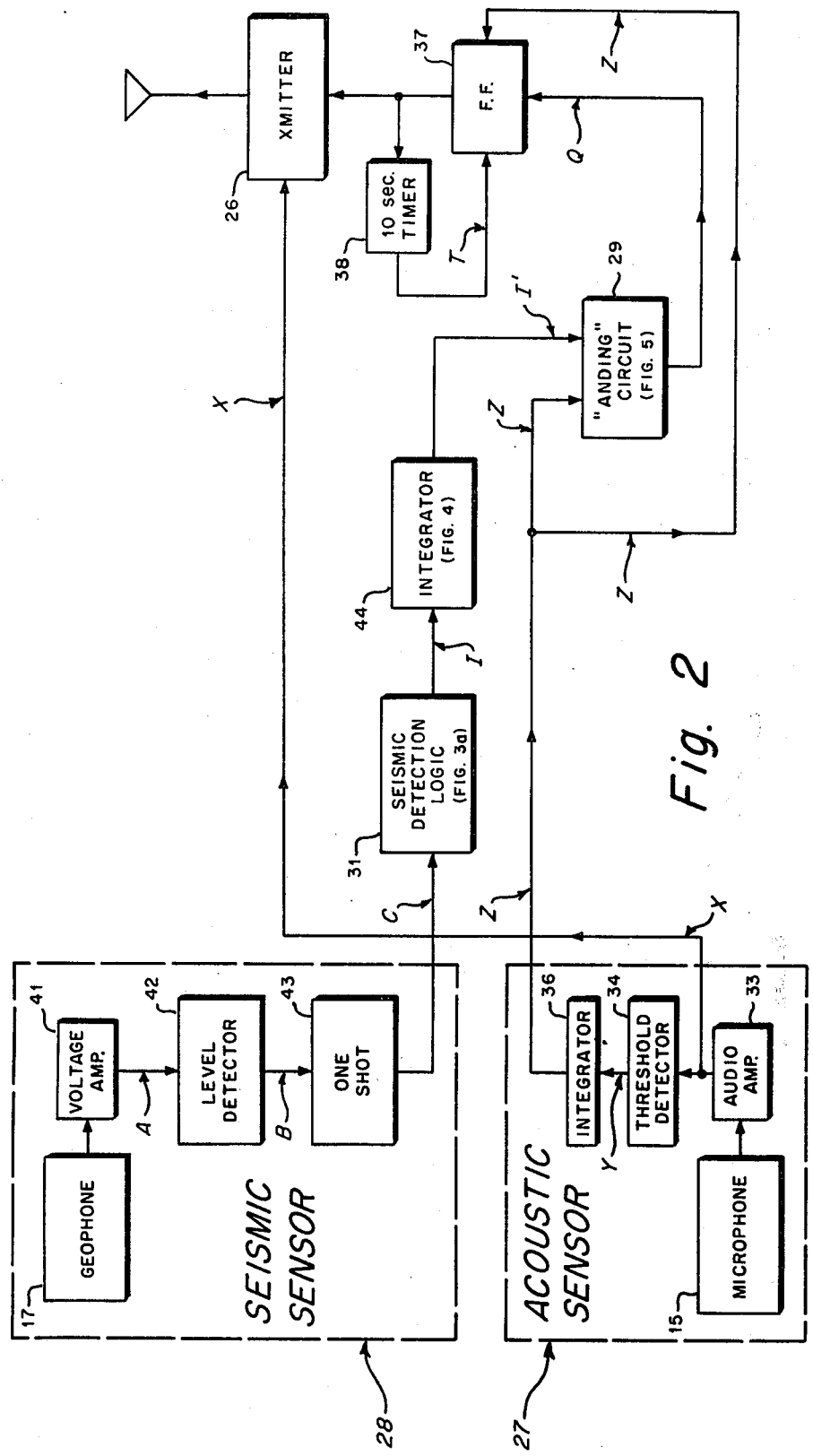
FIG. 2 is a block diagram of major electronic components of the detector of FIG. 1.

A detector 10 is depicted in FIG. 1 and is a generally cylindrical listening device which may be implanted manually in or near the area under surveillance. At one end of the detector 10 a stand 11 is formed of a threaded spike 12 and two crossed support members 13. The spike 12 secures the two support members 13 at their respective midpoints to the end of the cylinder 10 so that the support members are perpendicular to each other and to the axis of the cylinder. The spike 12 may be unscrewed allowing removal of the support members 13 which may be disconnected from each other for storage. When the unit is implanted, spike 12 is buried in the ground with the downwardly facing edges of the support members 13 gripping the surface. The detector 10 is thus vertically oriented. Near the other end of the detector 10 a perforated section 14 houses a microphone 15 (FIG. 3) responsive to acoustic noise from the surrounding area. Holes 16 in section 14 form a wind screen for the microphone. The holes are arrayed in groups of ten spaced equally around the circumference of section 14. Each group of ten holes comprises two columns of three holes aligned with the axis of the cylinder and one column of four holes similarly aligned between the other two columns. The diameter of the holes, their configuration and grouping on section 14 may be optimized to eliminate low frequency audio noise due to wind or air turbulence in the vicinity of the microphone. A remote geophone 17 senses seismic disturbances. A wire 18 wound on a rotatable spool section 19, located at the end of detector 10 adjacent stand 11, allows distant positioning of geophone 17. Geophone 17 obviously could be located in spike 12 if desired. However, remote placement is preferred since implantation may not be sufficiently rigid to eliminate spurious vibrations produced, for example, by wind gusts.

The electronic portion of detector 10 is housed in adjacent sections 21 and 22 located between sections 14 and 19. Section 21 adjacent to section 19 houses a battery (not shown) which powers an r.f. transmitter, amplifiers and additional circuitry contained in section 22. Detector 10 may be adapted to utilize many different types of transmitter antennas, such as a whip antenna or a hula-hoop antenna. In the embodiment shown in FIG. 1 the antenna may be of the center-fed dipole type. Cylindrical sections 21 and 22 themselves may form the two portions of the antenna.

Referring now to FIG. 2, a standard acoustic sensor 27 includes a microphone 15 connected via an audio amplifier 33 to a threshold detector 34 which produces an output having one voltage level for signals above threshold and another level for signals of inadequate intensity. The resulting step function output Y is passed to an integrator 36 to eliminate sharp discontinuities in voltage. Acoustic sensor 27 is coupled through a flip-flop 37 to an r.f. transmitter 26. When flip-flop 37 is energized, the acoustic analog signal X from amplifier 33 is broadcasted by transmitter 26 to a remote listening post. A timer 38 connected to the output of flip-flop 37 holds the transmitter on for ten seconds regardless of the condition of the acoustic signal once transmission is begun.

A seismic sensor 28, which includes geophone 17, participates with acoustic sensor 27 in the auxiliary gating of transmitter 26. The output of geophone 17 is fed via a voltage amplifier 41 to a level detector 42. A step function output B from level detector 42 is triggered whenever the amplified voltage exceeds a predetermined level. Level detector 42 is connected to a one-shot multivibrator 43 which "chops" output B from level detector 42 into a train of 70 pulses C having a 100 millisecond cycle.

Seismic sensor output C is passed to a seismic detection logic unit 31 which rejects seismic signals of short duration generated, for example, by ordnance detonations. Referring to FIG. 3a, whenever gate 45 is enabled by the correct signal H from gate 46, the pulse train, if any, from one-shot 43 is passed through gate 45 to a counter 47 comprising two series-connected flip-flops 48 and 49. The first pulse from gate 45 activates a six second timer 51 connected to gate 45. Timer 51 in turn activates a four second timer 52 which is connected in series with timer 51. The outputs G, E and F, from timer 52, flip-flop 48 and flip-flop 49 respectively, are fed to gate 46. On the third pulse in output D from gate 45 coincidence of the respective outputs of four second timer 52 and flip-flops 48 and 49 produces a signal from gate 46 which effectively closes gate 45. Approximately four seconds later, gate 46 again opens gate 45 allowing a pulse from the seismic sensor to enter the counter 47. If a single pulse is counted, the required coincidence between the respective outputs of flip-flops 48 and 49 and gate 45 will occur and gate 53, receiving outputs D, E and F, from gate 45 and flip flops 48 and 49 respectively will produce a single pulse output I. The output from the seismic detection logic unit 31 energizes a ten second timer 54, connected to timer 51, which inhibits further counting for ten seconds. The self-imposed delay conforms to the minimum transmission period required by timer 38 (FIG. 2). If counter 47 receives no pulses between four and six seconds, it is reset by six second timer 51. Thereafter, the complete cycle of logic unit 31 is begun again by the appearance of three more pulses in output D of gate 45.

Figure 3B:
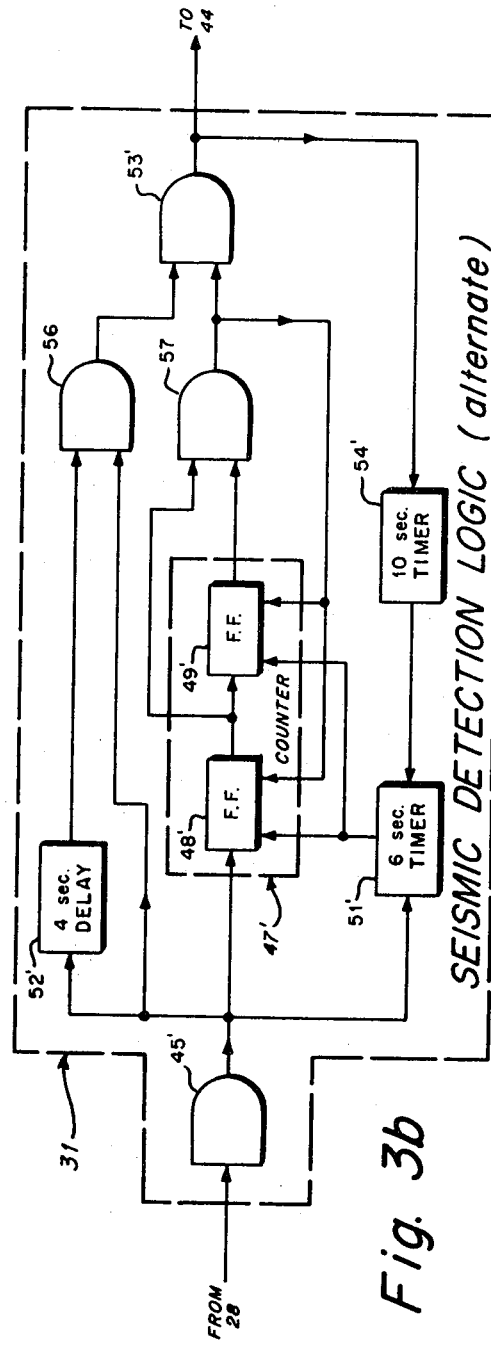
FIG. 3b is a logic diagram showing another detailed embodiment of the seismic detection logic unit.

FIG. 3b shows an alternate embodiment of seismic detection logic unit 31 in which the initial four second delay is provided by delay timer 52' connected between input gate 45' and a delay gate 56 which requires coincidence of the 4 second signal and the pulses from gate 45'. The counter 47' enters a "self-lock" mode after three pulses by using the output from a gate 57 connected to both flip-flops to inhibit further counting until counter 47' is reset by 6 second timer 51' or 10 second timer 54'. Gate 57 produces its inhibiting signal when the outputs from flip-flops 48' and 49' coincide. If an output from delay gate 56 occurs, the coincidence required for an output from gate 53' will be satisfied.

Pulse output I indicative of a detected seismic disturbance is passed to an analog intergrating circuit 44 connected between "ANDing" circuit 29 and detection logic unit 31 (FIG. 2). One of the principal purposes of integrator 44, an embodiment of which is shown in FIG. 4, is to eliminate the abrupt changes in voltage in the pulse output I from logic unit 31. The discontinuity represented by the leading edges of the pulses was found to create "cross-talk" or "ticking" noise in the transmitted acoustic signal due to the interface of the two sensors at "ANDing" circuit 29.

When a pulse in signal I enters integrator 44, a capacitor 58, in parallel with input I, at first acts as a short to ground. As the change rate of capacitor 58 decreases with time, a smaller portion of the current is passed to ground causing a gradual build-up of output I'. Resistor 59, in series with input I, and grounded resistor 61, connected to resistor 59, form a voltage divider. Any non-steady state component of the voltage will continue to be shorted to ground by capacitor 58. Thus, high frequency transient noise in the seismic signal will be decoupled.

The integrated seismic signal I' is next passed to an "ANDing" circuit 29 which also receives the acoustic signal Z. The output Q of the ANDing circuit 29 indicates whether there is coincidence between the seismic detection signal and the acoustic signal.

Referring to the detailed schematic of circuit 29 in FIG. 5, r.f. choke coils 62 are provided in series with the input of the seismic signal to isolate the electronic components associated with the seismic detection system. Isolation was needed since the physical location of the seismic equipment might interfere with r.f. transmission. A current limiting resistor 63 is connected to the base of an NPN transistor 64 which acts as an inverter. Switching the polarity of the seismic input I' was found to be necessary for operation of ANDing transistors 65 and 66, also of the NPN type. The collector of transistor 64 is connected through resistor 67 to a source of positive D.C. voltage and the emitter is grounded. A positive pulse at the base of transistor 64 causes conduction producing an analogous negative pulse at resistor 68 connected between the collector of transistor 64 and the base of transistor 65, which, like transistor 66, is normally in the "conducting" mode. Acoustic signal Z is connected via current limiting resistor 69 to the base of transistor 66. A capacitor 71, in parallel with the acoustic input, grounds out high frequency transients. The collectors of transistors 65 and 66 are connected via common resistor 72 to a positive voltage source. A grounded resistor 73 acts as a voltage divider with its series-connected resistor 72. For simultaneous seismic-acoustic detection, coincidence of pulses at the bases of transistors 65 and 66 "cuts off" both transistors and forces current to flow in the output lead 74, connected to the collector of transistor 65, sending signal Q to transmitter flip-flop 37. Once flip-flop 37 has been energized by an output pulse Q, transmitter 26 remains on until deactivated by ten second timer 38 (FIG. 2). Acoustic output Z may be further coupled to flip-flop 37 to inhibit deactivation of transmitter 26 by timer 38 during the presence of above-threshold noise.

OPERATION

Figure 6:
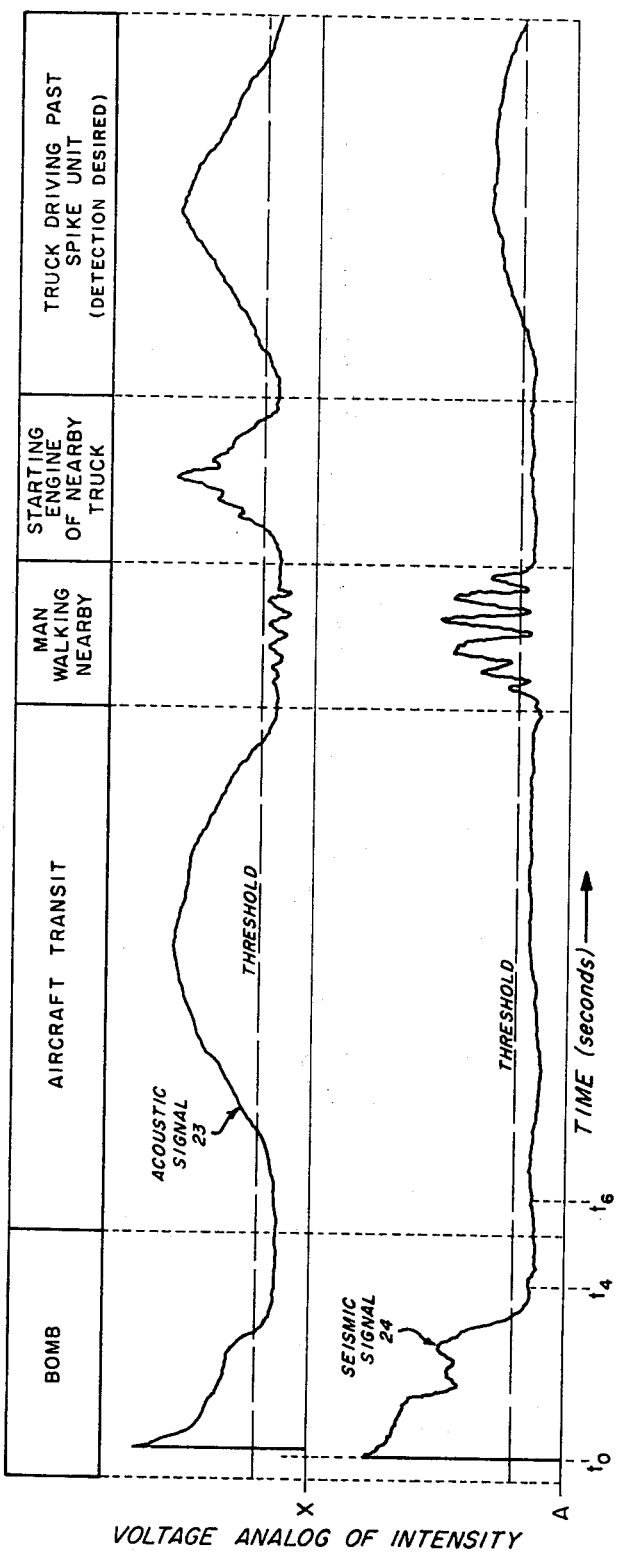
FIG. 6 is a graph showing typical simultaneous seismic and acoustic signals indicative of selected events as applied to the detector of FIG. 1.

For either seismic or acoustic sensing, the voltage analog of intensity may exceed threshold for events other than the movement of motorized equipment, as illustrated in graphs 23 and 24 of FIG. 6. By requiring coincidence of above-threshold signals for both acoustic and seismic vibrations, 23 and 24 respectively, false alarms on certain events, such as aircraft transits, may be avoided.

For a given disturbance, acoustic signals are usually more qualitative than the corresponding seismic signals. Therefore, in the present system it is the acoustic signal which is transmitted to the listening station. As shown in FIG. 2, signals C from seismic sensor 28 are used only to gate acoustic signals Z to transmitter 26 while acoustic sensor 27 provides both the transmitted signal X and the gating signal Z for ANDing circuit 29.

Ordnance detonations require additional rejection circuitry due to their hybrid seismic-acoustic nature, shown in the first column of FIG. 6. The most successful approach is to require a minimum duration of either the seismic or acoustic vibrations produced. Seismic detection logic unit 31 provides a 2 second "window" which opens four seconds after the occurrence of the first pulse in the output C from seismic sensor 28. Whenever a pulse is counted during the 2 second window, a "decision" is made that a seismic signal from a target source has been detected. The effective four second duration requirement agrees with the experimental finding that the rejection of signals which last less than four seconds removes a substantial number of ordnance-related signals without interfering with target vehicle detection.

Figure 7:
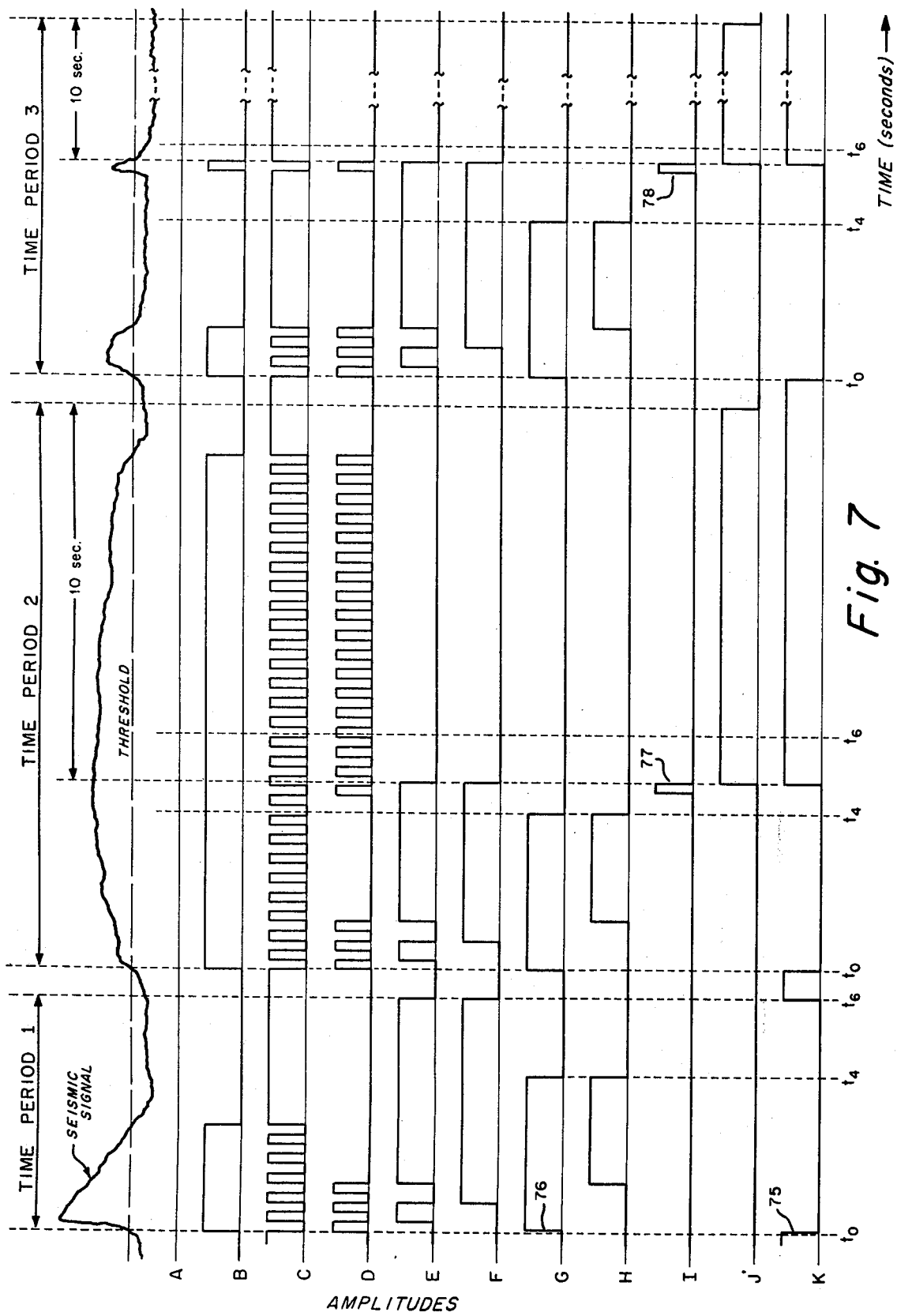

The timing diagram in FIG. 7 explains the somewhat complex interaction of signals in the seismic detection logic unit 31 of FIG. 3a. Since the operation of the embodiment in FIG. 3b is directly analogous, its corresponding timing diagram is omitted.

In each instance where the threshold level is exceeded, one-shot 43 (FIG. 2) converts output B from level detector 42 into pulses C which are inverted at D whenever they are permitted to pass through gate 45 (FIG. 3a). The leading edge of the first pulse at $t_0$ for each "Time Period" activates 6 second timer 51 whose output is shown in line K. Timer 51 in turn activates four second timer 52 (line G), a short time lag for response at 75 and 76 being inherent. Assuming that flip-flops 48 and 49 (lines E and F respectively) are responsive to the "going negative" edge of the inverted pulses in line D, flip flop 48 will count every other pulse as shown in line E. Flip-flop 49 counts every "going negative" edge of output E, thus registering every fourth pulse in line D. After the third pulse, however, coincidence occurs in lines E, F and G representing the input signals to gate 46. The output H of gate 46 is thus activated inhibiting further entry of pulses C through gate 45 until coincidence is destroyed at $t_4$ for each "Time Period" by the change in 4 second timer 52 output G.

In "Time Period 1" an idealized detonation is indicated in line A representing the seismic signal from amplifier 41 (FIG. 2). Threshold is not exceeded during the two second window and six second timer 51 (line K) reverts back to its "off" state at $t_6$, thereby resetting flip flops 48 and 49, lines E and F respectively. Thus, no output I has occurred from gate 53 during "Time Period 1" even though there was a brief seismic disturbance between zero and four seconds. The ordnance detonation has therefore been rejected as a target signal source.

Following the close of "Time Period 1" at $t_6$, logic unit 31 is capable of being "recycled". In "Time Period 2" long-lasting seismic disturbance from a moving vehicle, for example, is illustrated. A series of three pulses, not necessarily consecutive as shown, initiates the approximately four second interval during which gate 45, line D, is closed. At $t_4$ coincidence of lines E, F and G is broken thus enabling gate 45. Unlike the first Period, at this point in "Time Period 2" pulses are present in line D, the output from gate 45, since the disturbance lasts longer than four seconds. The first pulse within the two second window is actually the fourth pulse in line D since $t_0$ for "Time Period 2". Thus lines D, E and F, the latter two lines representing flip-flops 48 and 49 respectively, coincide for the first time. Gate 53 produces an output pulse 77 in line I indicative of the coincidence. The pulse 77, representing an affirmative detection "decision", is sent to ANDing circuit 29 (FIG. 2), from which, assuming a corresponding acoustic signal Z is met, an output Q is sent to energize flip-flop gate 37.

Pulse 77 in output I also energizes timer 54 whose output signal J turns off six second timer 51 (line K) and counter 47 (lines E and F). After a ten second delay corresponding to the transmitter "on" time, the cycle may be repeated. Thus, in overrides and ten second timer 38 override the six second reset signal from timer 51.

"Time Period 3" represents another situation for which the detection decision is affirmative. Two short disturbances four to six seconds apart are sufficient to produce an output pulse 78 on the fourth pulse counted.

Figure 8:
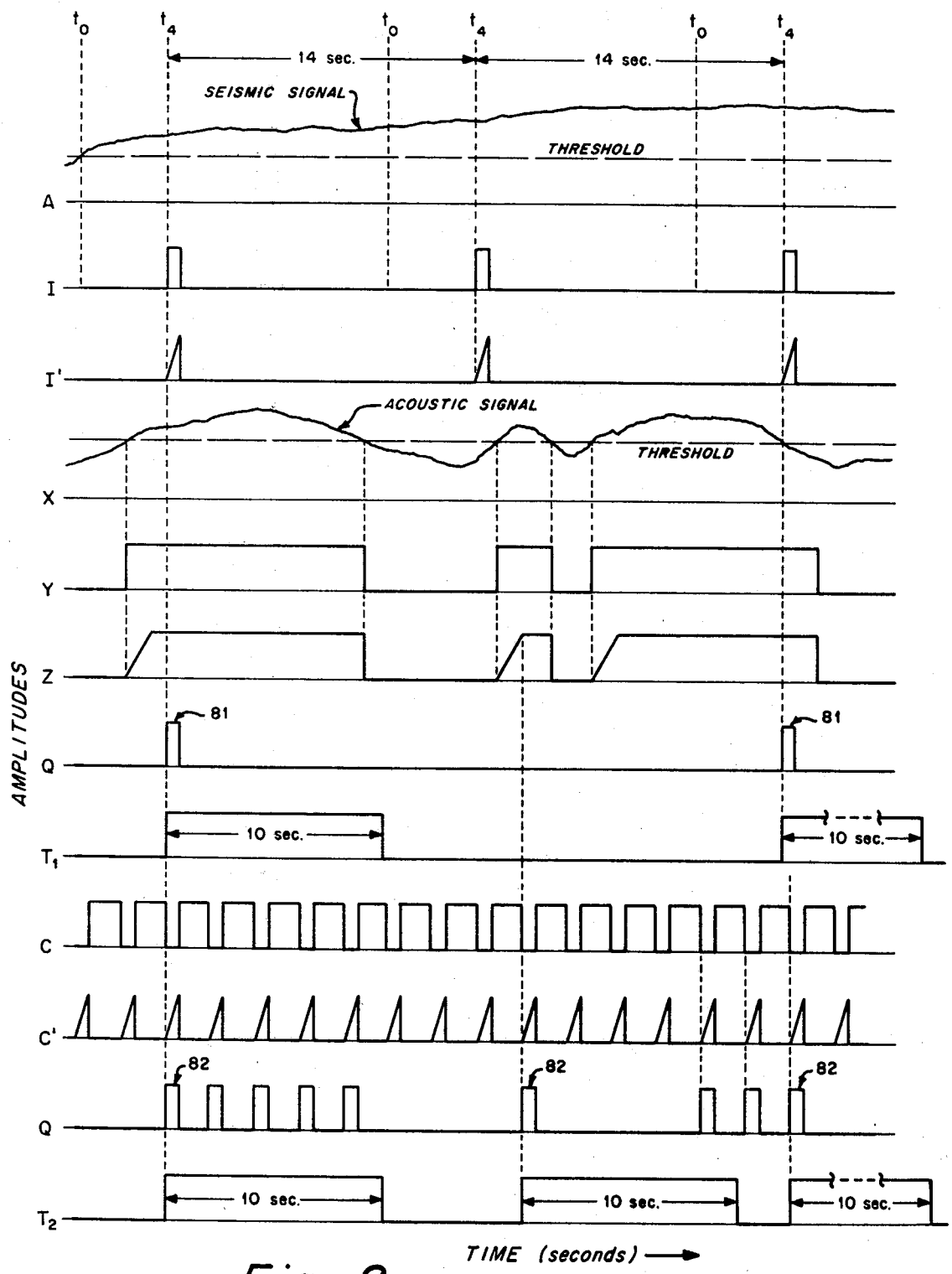
FIG. 8 is another timing diagram illustrating typical signals as applied to the "ANDing" circuit of FIG. 5.

FIG. 8 illustrates the timing characteristic of ANDing circuit 29. Lines A and X represent the amplified seismic and acoustic signals respectively. The seismic graph A indicates a continuous above-threshold disturbance extending over a number of consecutive cycles of the seismic detection logic unit 31, as shown for output I. Since in each cycle the fourth pulse will occur the instant the two second window is opened and the first pulse of the next cycle will occur as soon as the ten second timer 54 unlocks counter 47, the interval between pulses 79 will be 14 seconds.

The simultaneous acoustic signal X may, however, be more erratic and fall below threshold. Thus the output Y from threshold detector 34 (FIG. 2) may be discontinuous. The resultant AND output Q for the integrated signals I' and Z produces pulses 81 which, in each instance, turn the transmitter 26 "on" for ten seconds, as shown by line $T_1$ representing the output of ten second timer 38.

If seismic detection logic unit 31 is not employed, output C from seismic sensor 28 is passed directly to integrator 44 to produce the pulses shown in line C'. The signals to be ANDed would then be Z and C'. Output Q will contain pulses 82 indicative of coincidence. If flip-flop gate 37 is closed, the first pulse 82 opens it for ten seconds, as indicated by the condition of timer 38, output $T_2$.

Although it is clear that logic unit 31 can be bypassed altogether, it should be noted that, without the detection logic, ANDing circuit 29 may make erroneous detection decisions for ordnance detonations.

Many different methods for constructing the seismic detection logic unit 31, integrator 44 and ANDing circuit 29 are permissible. For example, ANDing circuit 29 may be constructed using diodes instead of transistors. The physical implementing components of logic unit 31 may be of any conventional form, low cost prepackaged logic elements being preferred. The seismic-acoustic system diagramed in FIG. 2 may be used in various types of signal-discriminating equipment and is not limited to use in the spike unit shown in FIG. 1.

Other systems besides that shown in FIG. 2 may be adapted to accommodate the logic system of detection unit 31. For example, detection logic unit 31 could be interposed directly between a seismic sensor and a seismic signal transmitter. Such an embodiment would, of course, omit the disclosed relationship between the seismic and acoustic sensors. However, the detection logic would continue to discriminate against short-lived signals caused by detonations. The logic system of unit 31 might also be adapted to perform a similar discriminating function for an acoustic sensor. The only fixed requirement for the embodiments of the logic system described is that the input be in pulse form. In fact, the detection logic system might be used simultaneously on the acoustic as well as the seismic channel, thereby obtaining an even higher rejection rate for ordnance detonations.

Several modifications of logic unit 31, FIG. 3a and FIG. 3b, are possible without destroying its usefulness. For example, four second timer 52 and gate 46 may be dispensed with entirely. The resulting logic system would simply require four pulses in output D from gate 45 within six seconds. Without providing a delay means, however, no "window" would be afforded and signals of short duration would not be rejected. An equivalent six second system is provided by removing four second delay 52' from FIG. 3b.

It should also be noted that ten second timer 54 may be deleted without degrading the rejection ability of the logic unit 31. Timer 54 is incorporated primarily to assist in coordinating the operation of logic unit 31 with transmitter timer 38.

Numerous advantages are achieved by the invention. The best features of two prior art independent detection systems has been utilized. Prior art seismic detectors have low false alarm rates for non-target signals which are primarily acoustic in nature, for example, aircraft noise. On the other hand, prior art acoustic sensors have low false alarm rates for vibrations which are primarily seismic, for example, animal movement. The combination of the two sensing systems produces low false signal rates for both classes of spurious signals. By requiring coincidence of acoustic and seismic detection, the false alarm rate of the detector has been reduced by as much as 90%.

The novel compatibility of the ANDing logic of circuit 29 with the detection logic of unit 31 permits a further increase in the reliability of the system. As a result, the transmitted acoustic signal is more confidently identified as originating from a motorized vehicle. Thus, classification of the acoustic signal by frequency analysis or other qualitative means need not be exclusively relied on for recognition of the signal source, as has been done in the past.

A further benefit of detection logic unit 31 is the reduction of "cross-talk" between seismic and acoustic systems since the output pulse rate of the preferred embodiment of seismic logic unit 31 cannot exceed one in every 14 seconds.

Size and weight of the equipment is also reduced by consolidating two types of sensors, seismic and acoustic, in a single unit. The single equipment may be produced at one-third the cost of both equipments. Inventory requirements are reduced. The time for deploying an equivalent number of old single sensor equipments is cut in half for the hybrid system of the present invention.

By serial placement of several units along a road, passing ground vehicles can be distinguished from very low flying aircraft producing seismic as well as acoustic vibrations. Since the range of the seismic sensor is less than that of the acoustic sensor, the ANDing circuit will cause transmission to be discontinuous for both low aircraft and ground vehicles. However, the interval between transmissions will be noticeably greater for ground vehicles.

Another advantage is the increased lifetime of the equipment. The high false alarm rate of the prior art acoustic sensors caused the power supplied to be more quickly exhausted. Transmitter "on" time must be kept to a minimum. It has been found that the detection device of the present invention lasts from six to seven times as long as comparable equipment having a single sensor and no ordnance discrimination means. This feature coupled with the compactness, increased reliability and reduced cost of manufacture indicates a remarkable improvement over prior sensing devices.

It will be understood that various changes in the details, materials, steps and arrangement of parts, which have been herein disclosed and illustrated in order to explain the nature of the invention, may be made by those skilled within the principle and scope of the invention as expressed in the appended claims.

What is claimed is:

1. A detection logic system for providing a logic signal when a predetermined number of pulses in an input signal are received during a preselected first time interval beginning with the first pulse, comprising:
    input gate means adapted to receive the input signal for producing an inverted replica signal thereof;
    first timing means connected to receive the replica signal for providing a reset signal at the end of the first interval;
    counter means coupled to receive the replica and reset signals for producing a first gating signal upon receiving one less than the predetermined number of replica signal pulses, said counter means resetting upon receiving the reset signal;
    second timing means operatively connected to receive the replica signal for providing a second gating signal during a preselected second time interval shorter than the first interval; and
    output gate means connected to receive the replica and gating signals for providing the logic signal upon coincidence of the received signals.

2. A detection logic system according to claim 1 wherein:
    said output gate means includes a first AND gate connected to receive the first and second gating signals for providing a third gating signal to said input gate means for inhibiting the replica signal upon coincidence of the received signals, and a second AND gate connected to receive the replica signal and first gating signal for providing the logic signal upon coincidence of the received signals.

3. A detection logic system according to claim 2 further comprising:
    third timing means connected to receive the logic signal for providing an inhibit signal to said first timing means for a preselected third time interval longer than the first interval.

4. A detection logic system according to claim 3 wherein:
    said counter means includes first flip-flop means coupled to receive said replica signal for producing a signal corresponding to the counting of a second said pulse, and second flip-flop means coupled to receive said first flip-flop signal for producing a signal corresponding to a fourth said pulse, said flip-flop signals forming thereby the first gating signal to said first and second AND gates.

5. A detection logic system according to claim 1 wherein:
    said output gate means includes a first AND gate receiving the replica and second gating signals for providing a third gating signal upon coincidence of the received signals, and a second AND gate receiving the first and third gating signals for providing the logic signal upon coincidence of the received signals.

6. A detection logic system according to claim 5 further comprising:
    third timing means connected to receive the logic signal for providing an inhibit signal to said first timing means for a preselected third time interval longer than the first interval.

7. A detector logic system according to claim 6, wherein:
    said counter means includes first flip-flop means coupled to receive said replica signal for producing a signal corresponding to the counting of a second said pulse, and second flip-flop means coupled to receive said first flip-flop signal for producing a signal corresponding to a fourth said pulse, said flip-flop signals forming thereby the first gating signal to said first and second AND gates.

* * * * *